United States Patent
Ikeda

(12) 
(10) Patent No.: US 7,564,486 B2
(45) Date of Patent: Jul. 21, 2009

(54) IMAGE SENSING APPARATUS WITH FEATURE EXTRACTION MECHANISM AND ITS CONTROL METHOD

(75) Inventor: Eiichiro Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 10/951,483

(22) Filed: Sep. 28, 2004

(65) Prior Publication Data

US 2005/0088536 A1 Apr. 28, 2005

(30) Foreign Application Priority Data

Sep. 29, 2003 (JP) .............................. 2003-338812
Sep. 14, 2004 (JP) .............................. 2004-267514

(51) Int. Cl.
*H04N 5/228* (2006.01)
*G06K 9/00* (2006.01)

(52) U.S. Cl. .................................... 348/222.1; 382/118

(58) Field of Classification Search .............. 348/222.1; 382/117, 118
See application file for complete search history.

(56) References Cited

U.S. PATENT DOCUMENTS

| 5,629,752 A | 5/1997 | Kinjo | |
|---|---|---|---|
| 6,335,987 B1 | 1/2002 | Yoon | |
| 6,430,370 B1 * | 8/2002 | Nonaka | 396/89 |
| 6,597,817 B1 * | 7/2003 | Silverbrook | 382/289 |
| 6,727,948 B1 | 4/2004 | Silverbrook | |
| 7,298,412 B2 * | 11/2007 | Sannoh et al. | 348/348 |
| 2001/0007469 A1 | 7/2001 | Fuchimukai et al. | |

FOREIGN PATENT DOCUMENTS

| JP | 7143434 | 6/1995 |
|---|---|---|
| JP | 8-63597 | 3/1996 |
| JP | 08063597 A * | 3/1996 |
| JP | A 08-063597 | 3/1996 |
| JP | 2001215403 | 10/2001 |
| JP | A2004-206738 | 7/2004 |
| JP | A2004-234688 | 8/2004 |
| JP | A2004-234689 | 8/2004 |
| JP | A2004-265431 | 9/2004 |
| KR | A 1999-59545 | 7/1999 |

* cited by examiner

*Primary Examiner*—Justin P Misleh
(74) *Attorney, Agent, or Firm*—Cowan, Liebowitz & Latman, P.C.

(57) ABSTRACT

The attitude of an image sensing apparatus is detected, and optimum filter processing is selected based on the result of detection for extracting feature information of a subject, thus processing is simplified. While a shutter button is half-depressed, it is determined whether the image sensing apparatus is performing landscape image sensing or portrait image sensing based on attitude information obtained from an attitude sensor (S105). Then based on the result of determination, one of two filter processings in different scan directions is performed thereby a person's face in an image is detected. Then image sensing conditions at the next timing are determined based on the area of the person's face in the image. When the shutter button is full-depressed, image sensing is performed in accordance with the latest image sensing conditions, and an obtained image is stored into a storage medium such as a memory card.

8 Claims, 8 Drawing Sheets

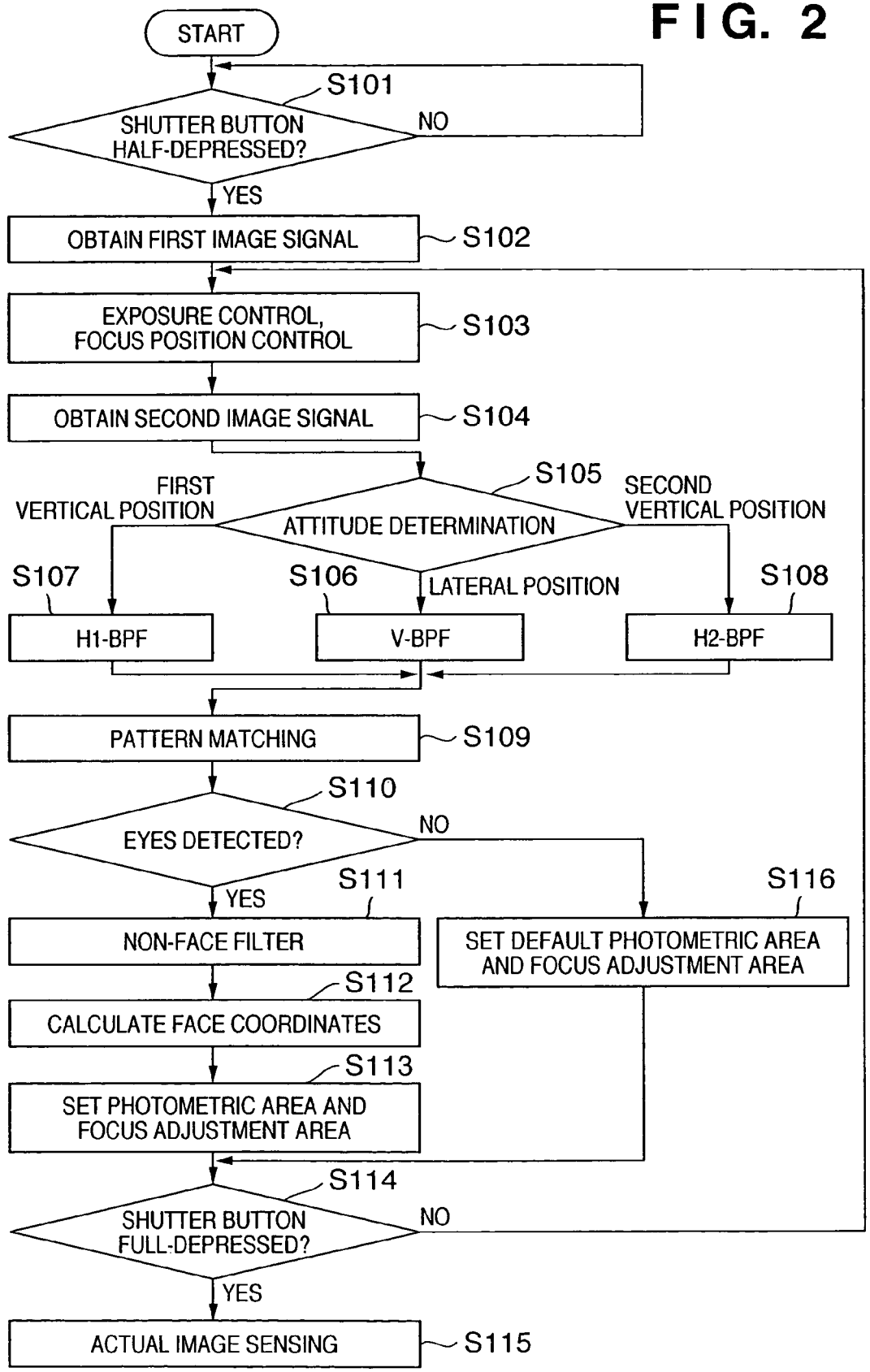
F I G. 2

FOCUS ADJUSTMENT AREA

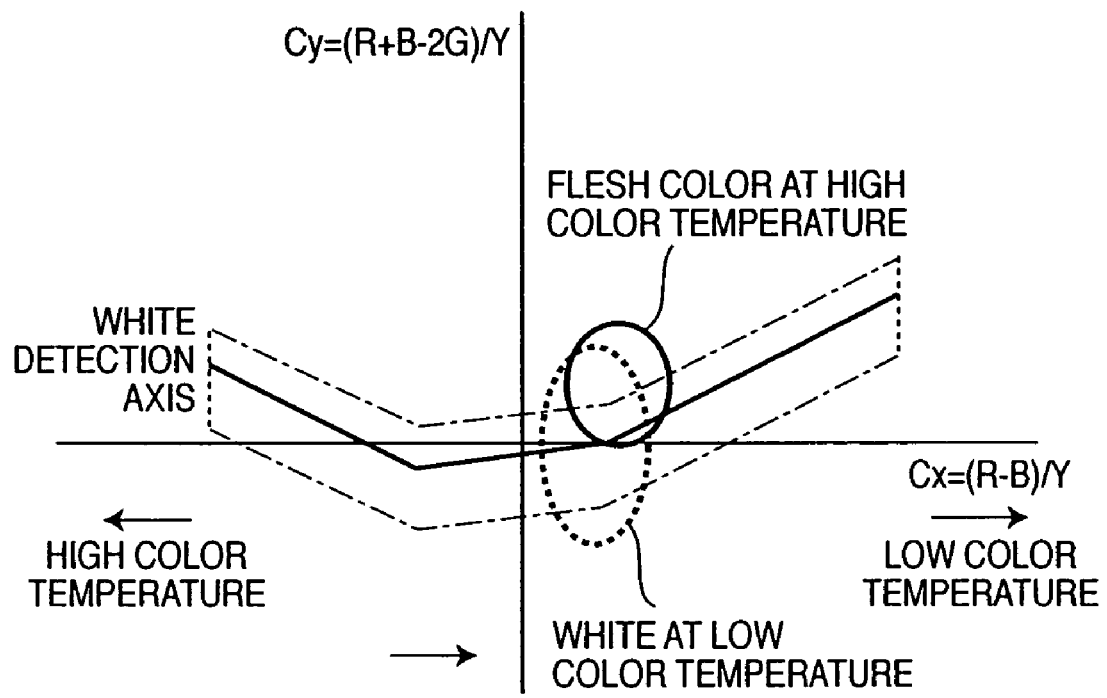
F I G. 7

IMAGE SENSING APPARATUS WITH FEATURE EXTRACTION MECHANISM AND ITS CONTROL METHOD

FIELD OF THE INVENTION

The present invention relates to an image sensing apparatus having a face detection function of detecting an area corresponding to a human face from an image (a digital camera, a digital video camera, a cellular phone with camera or the like), and its control method.

BACKGROUND OF THE INVENTION

When image sensing is performed on a person with an image sensing apparatus such as a digital camera, image sensing at well focus on the person's face as a subject and with optimum exposure for the face is required. In conventional cameras, a particular area is selected from predetermined plural areas in a screen, based on information on distance to a subject, subject contrast information or information in a user's visual axis, then image sensing is performed with focus on the particular area and optimum exposure for the particular area.

However, in the above method, if the person's face as a subject is not included in the predetermined plural areas, correct exposure and focus cannot be obtained on the person's face.

Accordingly, a camera having a function of detecting an area corresponding to a human face from an image by image processing has been proposed in Japanese Patent Application Laid-Open No. 2001-215403. According to this camera, image sensing can be performed with well focus on a human face in any position of an image sensing screen and with optimum exposure for the human face.

Further, as a method for detecting an area corresponding to a human face from an image by image processing, Japanese Patent Application Laid-Open No. Hei 8-63597 discloses detection of face candidate area presumed to be a face from an image, matching between the face candidate area and predetermined face reference data, and determination as to whether or not the face candidate area corresponds to the human face based on the result of matching.

According to the method proposed in Japanese Patent Application Laid-Open No. Hei 8-63597, the inclination of face in the image signal upon image sensing with the camera in a vertical position is different from that upon image sensing with the camera in a lateral position, as shown in FIG. 8. Accordingly, the face area detection processing must be performed plural times in different directions.

To detect a human face with high precision from an image obtained by a camera and reflect the result of detection in image sensing conditions, time for face detection must be reduced as much as possible. If much time is taken in face detection, processing time for control of focusing on the face and exposure is delayed, and release time lag from the user's image sensing instruction to actual image sensing with the camera is increased.

Accordingly, there is room for improvement in high speed detection of human face from an image obtained by image sensing.

SUMMARY OF THE INVENTION

The present invention has been proposed to solve the conventional problem, and provides a technique for detecting a human face at a high speed from an image obtained by image sensing.

According to one aspect of the present invention, the foregoing object is attained by providing an image sensing apparatus having an image sensing device, comprising an attitude detection unit to detect an attitude of the image sensing apparatus, and a feature extraction circuit to perform feature extraction from a subject in an image obtained based on an output from the image sensing device, wherein the feature extraction circuit changes a method of feature extraction from the subject based on attitude information detected by the attitude detection unit.

According to another aspect of the present invention, the foregoing object is attained by providing a control method for image sensing apparatus having an image sensing device and a feature extraction circuit which performs feature extraction from a subject in an image obtained based on an output from the image sensing device, comprising an attitude detection step of detecting an attitude of the image sensing apparatus, wherein a method of feature extraction from the subject by the feature extraction circuit is changed based on attitude information detected at the attitude detection step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart showing a processing procedure according to the embodiment;

FIG. 7 is a graph showing the white balance processing according to the embodiment.

DETAILED DESCRIPTION OF THE PREFERRED EMBODIMENT

A preferred embodiment of the present invention will now be described in detail in accordance with the accompanying drawings.

Figure 1:
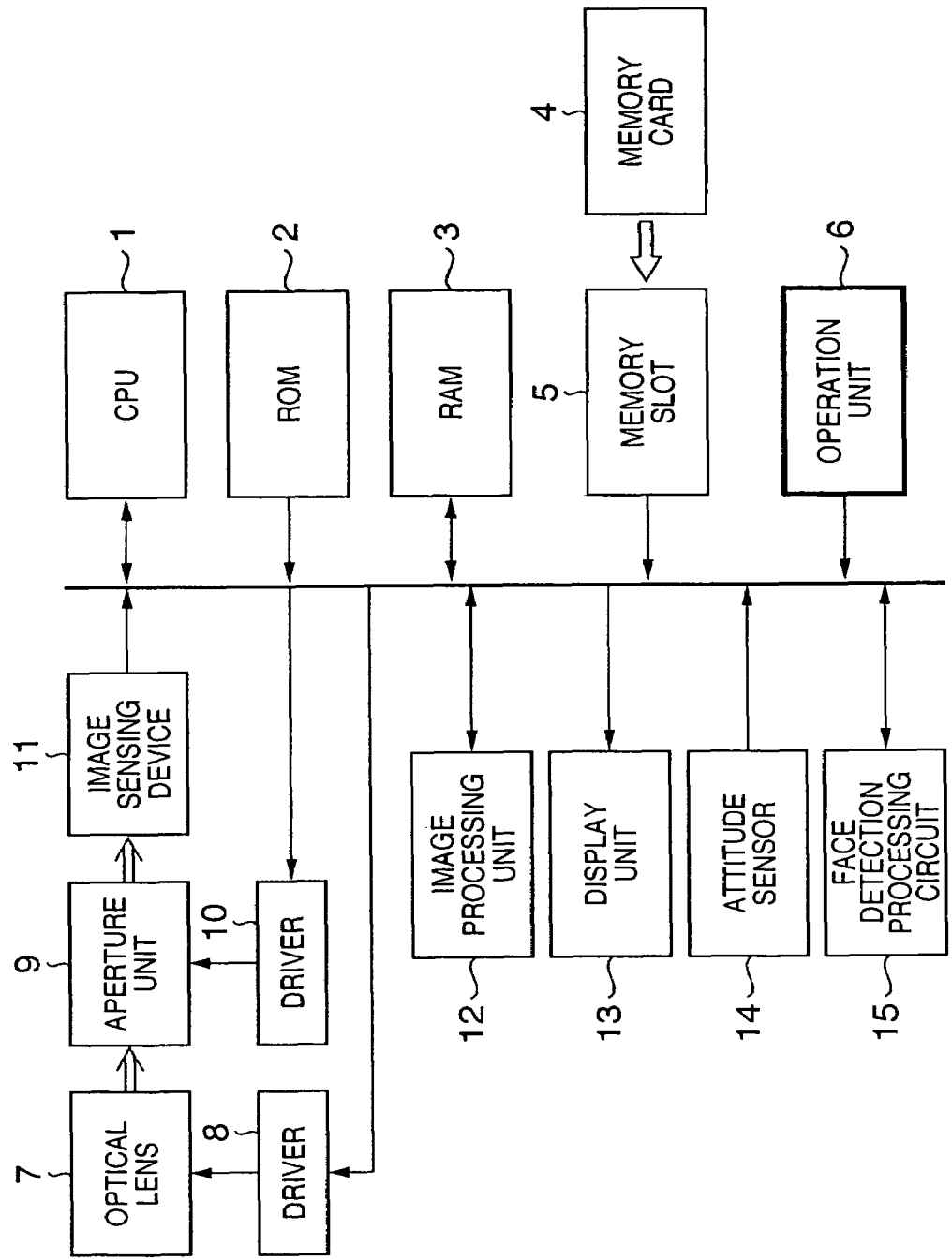
FIG. 1 is a block diagram of an image sensing apparatus according to an embodiment of the present invention.

FIG. 1 shows principal constituent elements of an image sensing apparatus according to the embodiment. The image sensing apparatus has a face detection function (a function of detecting an area corresponding to a human face from an image). Note that in the present embodiment, the image sensing apparatus is a digital camera.

In FIG. 1, reference numeral 1 denotes a CPU which controls the overall apparatus; 2, a ROM in which a processing procedure (program) for the CPU 1 and various data are stored; 3, a RAM used as a work area for the CPU 1, in which an image obtained by image sensing is temporarily stored; 4, a memory card as a removable storage medium; 5, a memory slot to electrically connect the memory card 4 to the image sensing apparatus; and 6, an operation unit having operation buttons including a shutter button. The shutter button has three status, i.e., a release status, a half-depressed status, and a full-depressed status, and includes a sensor for detecting respective statuses.

Numeral 7 denotes an optical lens group including zoom lens and focus lens; 8, a driver for control of focusing and zooming of the optical lens group 7; 9, an aperture unit; 10, a driver for the aperture unit 9; 11, an image sensing device such as a CCD or a CMOS having a photoelectric conversion function which converts an image formed via the optical lens group 7 and the aperture unit 9 into an electric signal; and 12, an image processing circuit which performs various image processings including Optical Black elimination processing (cancellation of any signal outputted from the image sensing device when the aperture is closed to prevent entrance of light from the subject), white balance processing, compression coding and decoding processing.

Numeral 13 denotes a display unit which displays an image obtained by image sensing and various menus; and 14, an attitude sensor which detects an attitude of the image sensing apparatus (first vertical position, second vertical position or lateral position) and outputs the result of detection. The attitude sensor 14 detects a status of the image sensing apparatus clockwise rotated more than 45° about an optical axis as a "first vertical position", and a status of the apparatus counterclockwise rotated more than 45°, as a "second vertical position", and the other status, as a "lateral position". As a reference status, the image sensing apparatus in a position to obtain a rectangular image having long sides along a horizontal direction and a short sides along a vertical direction. Numeral 15 denotes a face detection processing circuit which detects an area corresponding to a human face from an image signal outputted from the image processing circuit 12.

In the above construction, when the shutter button of the operation unit 6 is depressed, an image signal obtained with the image sensing device 11 is compression-encoded (generally, JPEG-encoded) by the image processing circuit 12, and stored in the memory card 4 connected to the memory slot 5.

Note that the image sensing apparatus of the present embodiment has image sensing modes including a portrait mode, a landscape mode and an auto mode. The portrait mode is programmed appropriately for image sensing of a person, to photograph a person as a central subject with low depth of field, such that the person cuts a good figure. The landscape mode is programmed appropriately for image sensing of a landscape, with infinite focal distance. The auto mode is programmed for automatically discriminating the feature of a subject thereby performing optimum image sensing.

One of these image sensing modes can be selected by a mode selection dial in the operation unit 6. The image sensing apparatus of the present embodiment has a function of, when the portrait mode or the auto mode is selected, enabling the face detection function, based on high probability that a person is included in the subjects and image sensing is to be performed with the person as a central subject, on the other hand, when the landscape mode is selected, disabling the face detection function, based on low probability of image sensing with a person as a central subject. This function realizes high-speed image sensing processing in the landscape mode.

FIG. 2 is a flowchart showing image sensing processing using the face detection function.

First, if half-depression of the shutter button has been detected (step S101), the CPU 1 obtains a first image signal in a status the optical lens group 7 and the aperture unit 9 are controlled to set predetermined first exposure conditions (aperture value and exposure time) and focus position (step S102). The first image signal is used in determination of second exposure conditions and focus position based on information obtained from a particular area set as a default (step S103).

Next, the CPU 1 obtains a second image signal in a status where the optical lens group 7 and the aperture unit 9 are controlled to set the second exposure conditions and focus position (step S104). As simple exposure control and focus adjustment control are previously performed at steps S101 to S104, the subject image in the image signal is clarified and the precision of face detection processing is improved. Further, at that time, the CPU 1 determines whether the current image sensing is lateral position image sensing, first vertical position image sensing or second vertical position, based on a detection signal from the attitude sensor 14 (step S105). Then, the face detection processing circuit 15 determines, based on the result of determination, whether filter processing (edge detection processing) as preprocessing for face detection is to be performed in a vertical direction (step S106), a first horizontal direction (step S107) or a second horizontal direction (step S108) of the image, and performs one of the processings.

If it is determined at step S105 that the image sensing is performed in the lateral position, the second image signal is read from the memory by 1 line in the vertical direction, then a band-pass filter is applied in the vertical direction, and a vertical high frequency signal (edge information) is stored in the RAM 3 (step S106). If it is determined that the image sensing is performed in the first vertical position, the second image signal is read from the memory by 1 line in the horizontal direction, then the band-pass filter is applied in the horizontal direction, and a horizontal high frequency signal is stored in the RAM 3 (step S107). Further, if it is determined that the image sensing is in the second vertical position, the second image signal is read from the memory by 1 line in the horizontal direction, from the opposite side to that at step S107, then the band-pass filter is applied in the horizontal direction, and a horizontal high frequency signal is stored in the RAM 3 (step S108).

Figure 3A:
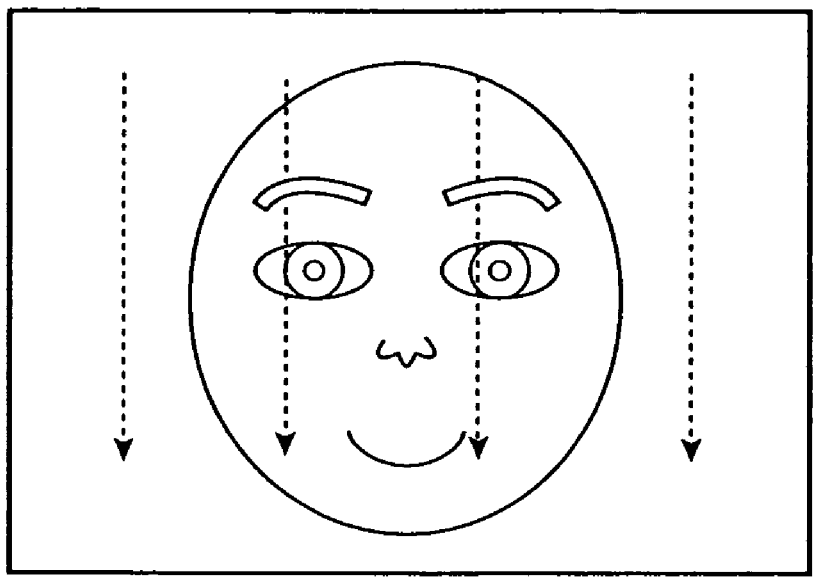
FIG. 3A is an explanatory view showing a scan direction of filter processing when the image sensing apparatus is in a lateral position.

The vertical and horizontal directions are defined on the assumption that a long side of the rectangular image obtained by the image sensing apparatus is along the horizontal direction and a short side is along the vertical direction. In the lateral position, as an image of person's face as shown in FIG. 3A is obtained, the filter (edge detection processing) processing is performed at step S106 along arrows in FIG. 3A, and the result of processing is stored in the RAM 3. Further, in the first vertical position, as an image as shown in FIG. 3B is obtained, the filter processing (edge detection processing) is performed at step S107 along arrows in FIG. 3B, and the result of processing is stored in the RAM 3.

Figure 3B:
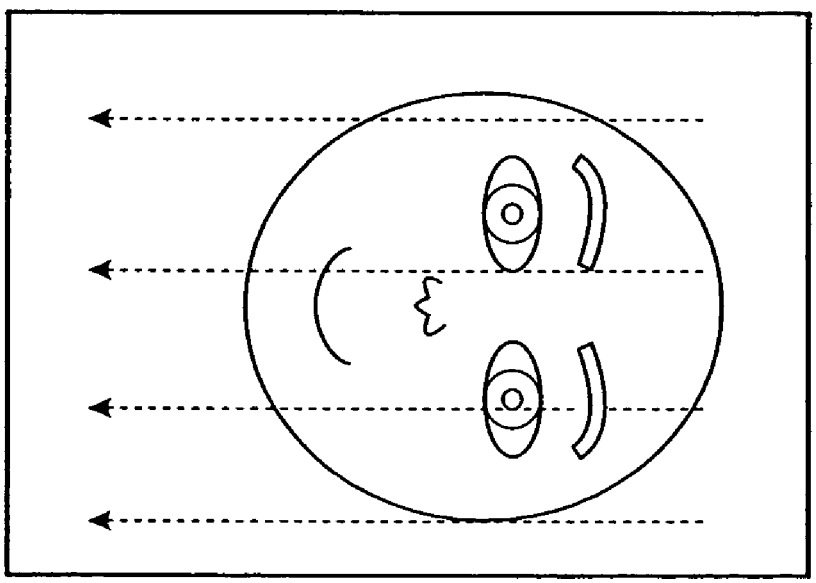
FIG. 3B is an explanatory view showing a scan direction of filter processing when the image sensing apparatus is in a first vertical position.

In a case where edge detection is performed on the face images in FIGS. 3A and 3B in a direction parallel to the short side of the rectangular image, the result of edge detection in FIG. 3A is greatly different from that in FIG. 3B. Accordingly, in the present embodiment, the direction of edge detection is changed in accordance with the result of detection by the attitude sensor 14.

Further, the face image in FIG. 3B may be previously rotated to the same direction as that of the face image in FIG.

3A before edge detection, or edge detection may be performed on the face image from plural directions. However, for rotation of the entire image signal on the assumption of the lateral position, the first vertical position and the second vertical position, or for edge detection from plural directions, much processing time is required.

In the present embodiment, as the direction of edge detection on the image signal is set in accordance with the attitude of the image sensing apparatus, the edge detection can be performed in the vertical direction to the person's face in the obtained image regardless of the attitude of the image sensing apparatus. Thus accurate face detection processing can be performed in short time.

When the processing at step S106, S107 or S108 has been performed, the face detection processing circuit 15 performs pattern matching (step S109). In the pattern matching, the high frequency signal stored in the RAM 3 is compared with a previously-stored reference signal, i.e., shape pattern recognition processing regarding human eye is performed, thereby an eye candidate group is detected. At the same time, regarding parts having characteristic points such as nose, mouth, ear and the like, the high frequency signal is compared with a reference signal group, thereby detection is made by shape recognition.

At this time, as the attitude of the image sensing apparatus has already been determined, the processing is performed in a frame of candidate group in the corresponding direction, thereby the pattern matching processing can be simplified.

When the pattern matching processing has been completed, it is determined whether or not human eye (eyes) has been detected (step S110). If human eyes have been detected, the eye candidate group data is further reduced by linkage of eyes in pair among the detected eye candidate group. Then based on the eye candidate group data and other parts, (nose, mouth and ears), one of preset non-face condition filters (stored in the ROM 2) is selected, and an area passed through the filter is determined as a "face" (step S111). The face detection processing circuit 15 returns the sizes and positions of the areas determined as "eyes" and "face" to the CPU 1 (step S112). The CPU 1 performs weighting on a photometric area based on the detected face area, and sets the area including the eyes as a central portion, as a focus adjustment area (step S113).

Note that in the case of digital camera, generally an image obtained during image sensing is displayed on the display unit 13 in a real-time manner. In a case where a person's face (especially, eyes) is detected while the shutter button is half-depressed, a predetermined sign, indicating that a face detection has been made is displayed on the display unit 13. This notifies that optimum image sensing conditions for the person's face have been set.

On the other hand, if it is determined at step S110 that eyes have not been detected, default photometric area and default focus adjustment area are set (step S116), and exposure control and focus adjustment control are performed based on these areas.

In any way, when the photometric area and the focus adjustment area have been set, it is determined whether or not the shutter button has been full-depressed (step 114). The above processing is repeated as long as the shutter butter is half-depressed. Further, if the full depression of the shutter button has been detected (step S114), the aperture unit 9 is controlled to attain optimum luminance in the latest photometric area, the optical lens group 7 is driven to obtain focus on the latest focus adjustment area, and image sensing is performed. The obtained image signal is compression-encoded, and written into the memory card 4 (step S115).

Next, the exposure control and the focus adjustment control at step S115 will be described in more detail.

Figure 4:
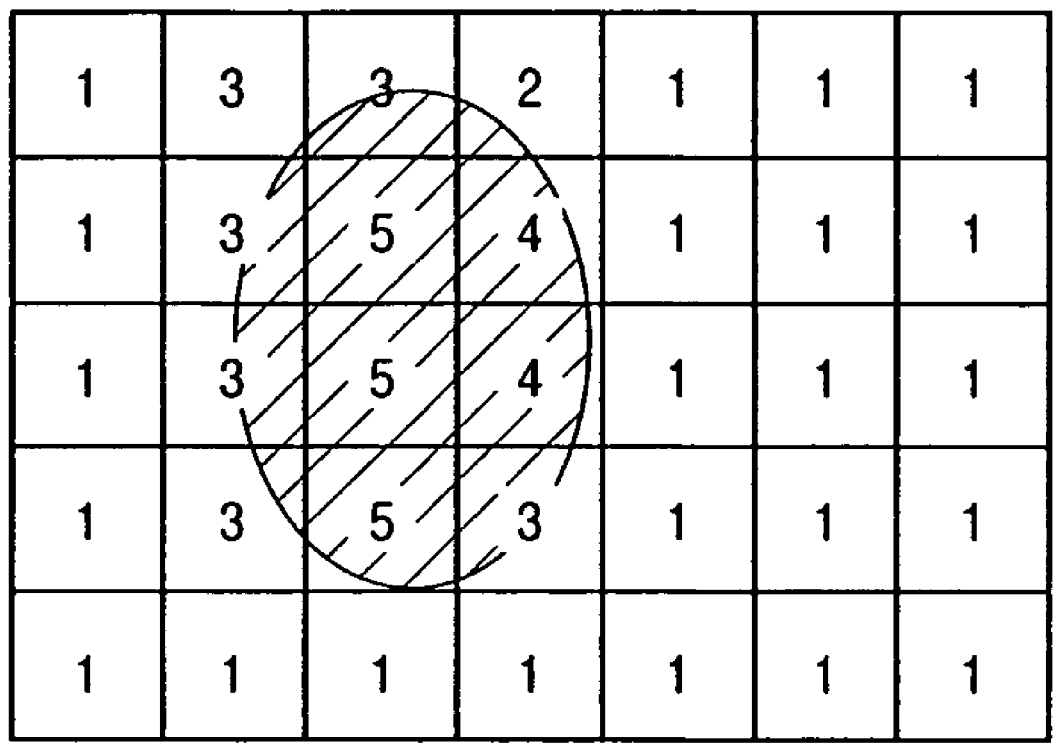
FIG. 4 is an explanatory view showing weighting in small areas used in exposure control according to the embodiment.

As shown in FIG. 4, a predetermined image screen is divided into plural blocks (small areas), and a luminance value in each block is calculated. In FIG. 4, an area enclosed within an ellipse is a face area detected by the face detection processing circuit 15. At this time, weighting is performed in accordance with the ratio of face area in each block. In this case, 5-level weighting is performed. "5" indicates that only the face area exists in the block. In a block including both face and non-face areas, a value corresponding to the ratio therebetween is assigned. In a block including only the non-face area, "1" is assigned.

As a result, assuming that each block luminance is Bi(i=1, 2..., total number of blocks), and each weight value is Di, the integrated luminance TB of the entire image is expressed as $$TB = \Sigma Bi \times Di$$

Next, the aperture and shutter speed are calculated such that a mean luminance value of the integrated luminance value of the respective luminance values becomes a preset target luminance value. Thus exposure correction to attain optimum luminance with preference to face area can be realized. Particularly, exposure in backlight situation can be set to an optimum exposure level for a subject person. Further, exposure correction may be performed by using only the luminance value obtained from the face area detected by the face detection processing circuit 15 without weighting.

Figure 5:
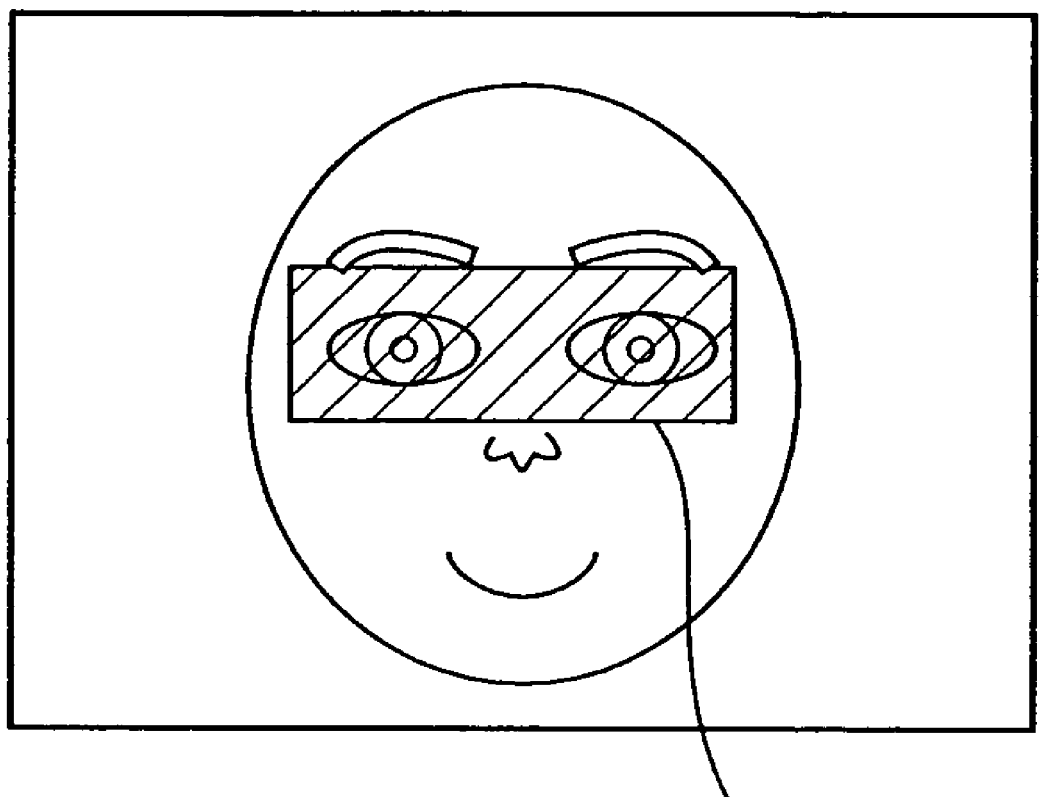
FIG. 5 is an explanatory view showing a focus adjustment area according to the embodiment.

Further, as shown in FIG. 5, the focus adjustment area is set so as to include the detected eyes, and the optical lens group 7 is controlled to obtain focus within the focus adjustment area.

More specifically, the focus of the optical lens group 7 is moved by predetermined step width and image sensing is performed at every step then a luminance signal is generated from an image signal in a set focus adjustment area, and the band-pass filter is applied, thereby a high frequency signal group is generated. Then the sum of the absolute values of the respective high frequency signal group is calculated as an AF (Auto Focus) signal. A position with a maximum AF signal value is determined as a focused position, and the focus lens included in the optical lens group 7 is set to the position.

Note that in a case where plural face areas have been detected as areas corresponding to faces, the above processing is performed in the respective face area, and the focus lens is moved to a focused position with the closest distance. Thus focus precision for a face, especially eyes, can be improved.

Figure 6:
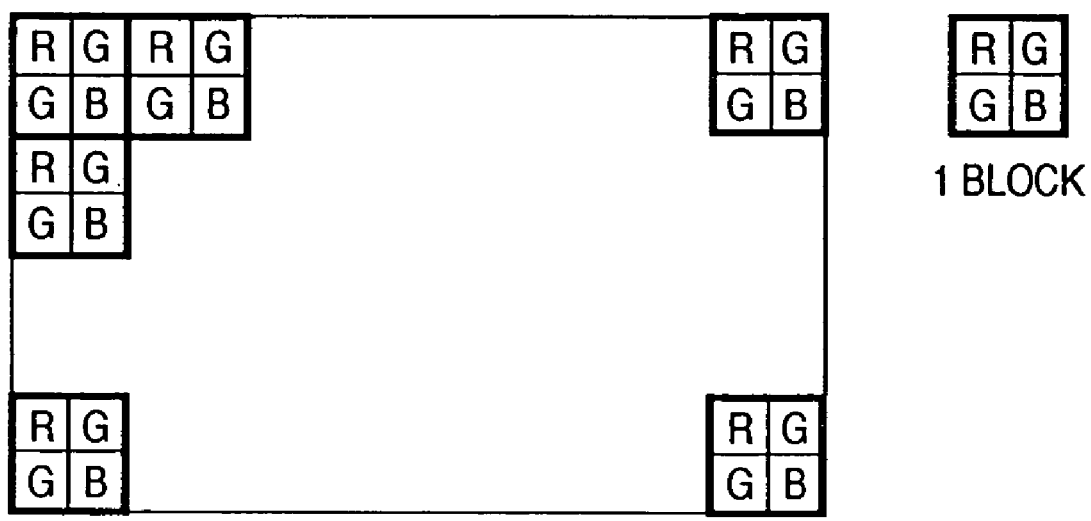
FIG. 6 is an explanatory view showing small areas used in white balance processing according to the embodiment.
Figure 8:
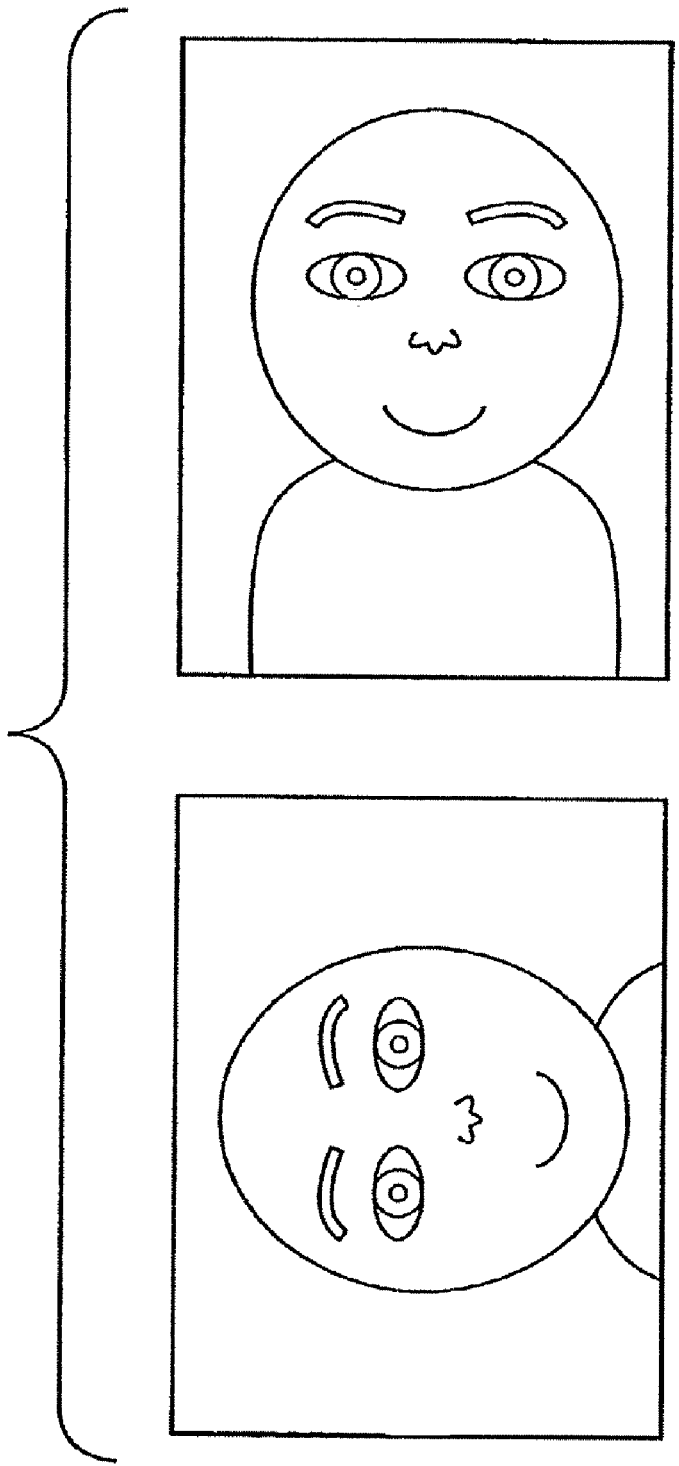
FIG. 8 is an explanatory view showing the change of image direction in accordance with the position of the image sensing apparatus.

Further, as shown in FIG. 6, the image screen is divided into plural small blocks covered with RGB color filters, and a white evaluation values (Cx, Cy) are calculated in each block by using the following expressions.

$$Cx = (R-B)/Y$$

$$Cy = (R+B-2G)/Y$$

The R, G and B values are obtained by photoelectric conversion of light flux passed through the R filter, G filter and G filter. The Y value is a luminance value obtained by calculation of these R, G and B values.

If the respective color evaluation values stand within a preset white detection range (FIG. 7), the block is determined as white (referred to as "white search"), and a white balance gain is calculated from the integrated pixel value of the block. This is a basic algorithm of generally used white balance processing. However, as shown in FIG. 7, as a white subject under a low color-temperature light source and a flesh-color subject under a high color-temperature light source have approximately the same color evaluation values, correct color temperature determination cannot be performed. In the present embodiment, to avoid this inconvenience, a small block determined as face is excluded from the white search. Further, in addition to the white detection, flesh-color detection is performed similarly to white detection in an area determined as face, and the color temperature is specified from a preset flesh color and color temperature characteristic graph. Thus correct light-source color temperature can be calculated.

As described above, according to the present embodiment, the method of face detection can be changed in accordance with the attitude (lateral or vertical position) of the image sensing apparatus. Accordingly, a person's face can be detected at a high speed from an image obtained by image sensing.

Note that in the present embodiment, the image sensing apparatus is a digital camera, however, the present invention is not limited to this embodiment. The present invention can be implemented in other apparatuses (a digital video camera, a cellular phone with a camera and the like) than the digital camera.

Further, in the present embodiment, the face detection function is enabled if the image sensing mode is the portrait mode or the auto mode, however, the present invention is not limited to this arrangement. For example, the image sensing apparatus of the embodiment may be further provided with a manual setting mode to disable the face detection function in accordance with the user's instruction even if the image sensing mode is the portrait mode or the auto mode.

Further, in the present embodiment, an area corresponding to a face is detected by detecting the positions of eyes and other parts based on the eye positions, however, the present invention is not limited to this arrangement. The present invention can be applied to only detection of eyes or only detection of other parts by changing the method of detection in accordance with the attitude of the image sensing apparatus.

As described above, according to the present invention, the method of face detection can be changed in accordance with the attitude of the image sensing apparatus. Accordingly, a person's face can be detected at a high speed from an image obtained by image sensing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Application No. 2003-338812 filed on Sep. 29, 2003 and Japanese Patent Application No. 2004-267514 filed on Sep. 14, 2004, the entire contents of which are hereby incorporated by reference herein.

What is claimed is:

1. An image sensing apparatus having an image sensing device, comprising:
   an attitude detection unit configured to detect an attitude of said image sensing apparatus;
   a plurality of filter processing circuits configured to read image signals obtained by said image sensing device in a direction different from each other, and to extract edge information from the read image signals; and
   a feature extraction circuit configured to select one of the plurality of filter processing circuits in accordance with the attitude detected by said attitude detection unit and to recognize the shape of an object in said image signals in accordance with the edge information extracted by the selected filter processing circuit.

2. The image sensing apparatus according to claim 1, further comprising:
   a control circuit to determine an image sensing condition based on the result of shape recognition by said feature extraction circuit.

3. The image sensing apparatus according to claim 2, wherein said feature extraction circuit extracts at least one of position information of an area including a person's face and position information an area including the person's eye in the image signals,
   and wherein said control circuit performs focus adjustment to obtain focus on an area specified by the position information.

4. The image sensing apparatus according to claim 2, wherein said feature extraction circuit extracts at least one of position information of an area including a person's face and position information of an area including the person's eye in the image signals,
   and wherein said control circuit performs exposure control in accordance with luminance information weighted with reference to an area specified by the position information.

5. The image sensing apparatus according to claim 1, wherein said feature extraction circuit extracts at least one of position information of an area including a person's face and position information of an area including the person's eye in the image signals.

6. The image sensing apparatus according to claim 1, further comprising:
   an image sensing mode setting unit to select an image sensing program,
   wherein said feature extraction circuit does not perform the shape recognition of an object if a predetermined image sensing program has been set by said image sensing mode setting unit.

7. A control method for image sensing apparatus having an image sensing device, comprising:
   an attitude detection step of detecting an attitude of said image sensing apparatus;
   a plurality of filter processing step of reading the image signals obtained by said image sensing device in a direction different from each other and to extract edge information from the read image signals; and
   a feature extraction step of selecting one of the plurality of filter processing steps in accordance with the attitude detected in said attitude detection step and to recognize the shape of an object in said image signals in accordance with the edge information extracted in the selected filter processing step.

8. The control method for image sensing apparatus according to claim 7, further comprising:
   a control step of determines an image sensing condition based on the result of shape recognition in said feature extraction step.

* * * * *